(12) United States Patent
Lai et al.

(10) Patent No.: US 8,908,979 B2
(45) Date of Patent: Dec. 9, 2014

(54) SHAPE AND SYMMETRY DESIGN FOR FILTERS IN VIDEO/IMAGE CODING

(75) Inventors: Wang Lin Lai, Richardson, TX (US); Felix Carlos Fernandes, Plano, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 199 days.

(21) Appl. No.: 13/494,854

(22) Filed: Jun. 12, 2012

(65) Prior Publication Data

US 2012/0321205 A1    Dec. 20, 2012

Related U.S. Application Data

(60) Provisional application No. 61/497,857, filed on Jun. 16, 2011, provisional application No. 61/532,465, filed on Sep. 8, 2011.

(51) Int. Cl.
*G06K 9/36* (2006.01)
*G06K 9/40* (2006.01)
*G06K 9/46* (2006.01)
*H04N 19/00* (2014.01)

(52) U.S. Cl.
CPC . *G06K 9/36* (2013.01); *H04N 19/00* (2013.01)
USPC .......................................... 382/233; 382/260

(58) Field of Classification Search
CPC .................................................. H04N 7/26382
USPC ............................ 382/233, 260–265; 348/608
See application file for complete search history.

(56) References Cited

U.S. PATENT DOCUMENTS

| | | | |
|---|---|---|---|
| 6,192,162 B1 * | 2/2001 | Hamilton et al. | 382/266 |
| 6,993,191 B2 | 1/2006 | Petrescu | |
| 7,206,453 B2 | 4/2007 | Lee et al. | |
| 7,437,013 B2 | 10/2008 | Anderson | |
| 2002/0186890 A1 * | 12/2002 | Lee et al. | 382/239 |
| 2005/0135700 A1 * | 6/2005 | Anderson | 382/261 |
| 2008/0075165 A1 | 3/2008 | Ugur et al. | |
| 2008/0152244 A1 * | 6/2008 | Suino | 382/248 |
| 2009/0129465 A1 * | 5/2009 | Lai et al. | 375/240.02 |
| 2009/0190657 A1 * | 7/2009 | Park et al. | 375/240.03 |
| 2010/0246692 A1 * | 9/2010 | Rusanovskyy et al. | 375/240.29 |
| 2010/0303338 A1 * | 12/2010 | Stojancic et al. | 382/154 |
| 2010/0329361 A1 * | 12/2010 | Choi et al. | 375/240.29 |
| 2011/0142136 A1 * | 6/2011 | Liu et al. | 375/240.18 |
| 2012/0082219 A1 * | 4/2012 | Sun et al. | 375/240.12 |
| 2012/0189064 A1 * | 7/2012 | Kossentini et al. | 375/240.25 |

OTHER PUBLICATIONS

Stanley J. Reeves, ("On the selection of median structure for image filtering," IEEE T. Circuits and Systems—II. Analog and Digital Signal Processing, vol. 42, No. 8, Aug. 1995, pp. 556-558).*

(Continued)

*Primary Examiner* — Yubin Hung

(57) ABSTRACT

An apparatus includes a video/image encoder configured to design a two-dimensional star-shaped spatial filter and encode image/video information using the X-shaped spatial filter. The star-shaped spatial filter includes a first linear arrangement of coefficients that extend outwardly in a first diagonal direction from a center pixel coefficient, a second linear arrangement of coefficients that extend outwardly in a second diagonal direction, and two linear arrangements of coefficients that extend outwardly in horizontal and vertical directions from the center pixel coefficient from the center pixel coefficient. The second diagonal direction is oriented in a different direction relative to the first diagonal direction.

18 Claims, 7 Drawing Sheets

(56) References Cited

OTHER PUBLICATIONS

John C. Russ, ("The Image Processing Handbook—3rd ed.," 1999, pp. 174-182).*

International Search Report dated Dec. 27, 2012 in connection with International Patent Application No. PCT/KR2012/004813.
Written Opinion of the International Searching Authority dated Dec. 27, 2012 in connection with International Patent Application No. PCT/KR2012/004813.

* cited by examiner

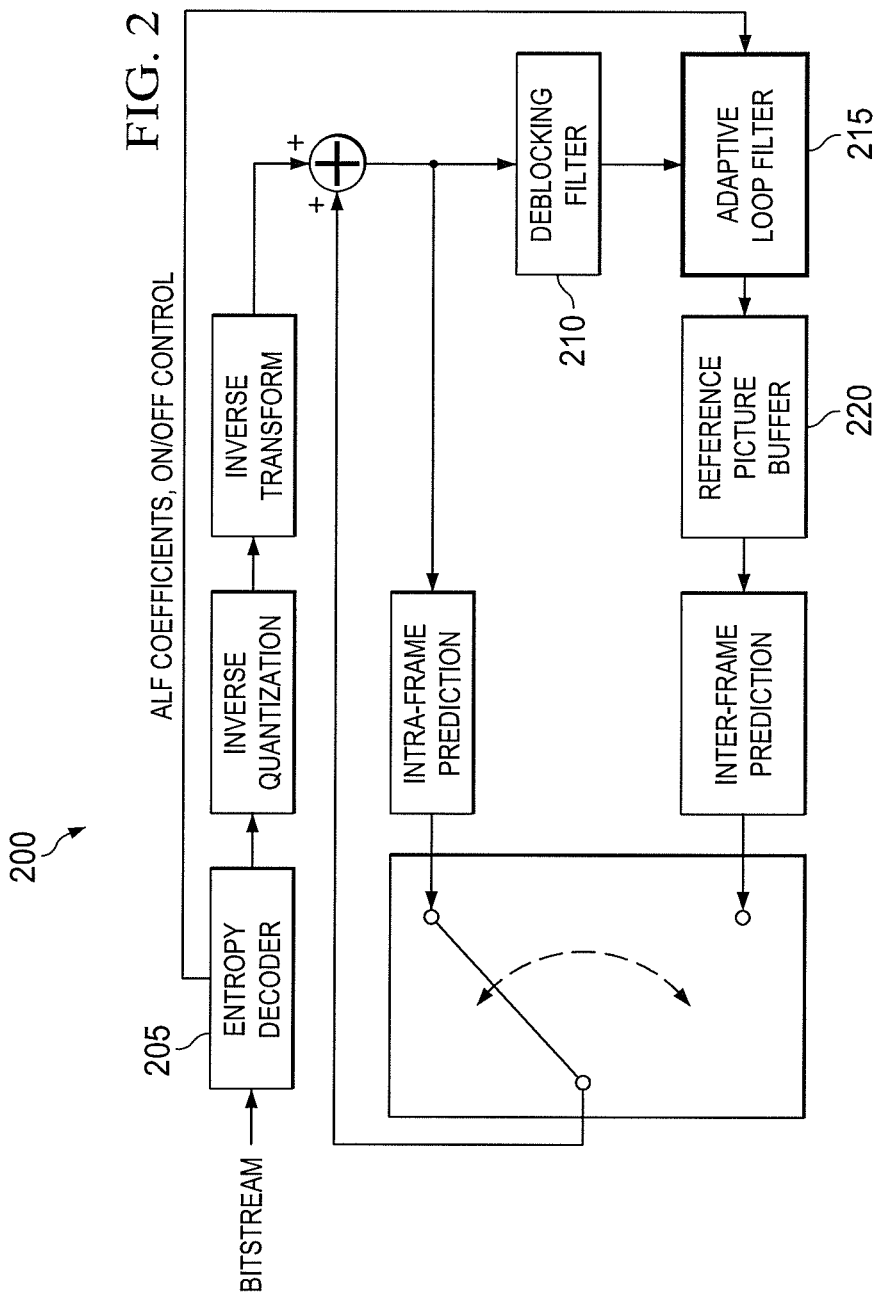

SHAPE AND SYMMETRY DESIGN FOR FILTERS IN VIDEO/IMAGE CODING

CROSS-REFERENCE TO RELATED APPLICATION(S) AND CLAIM OF PRIORITY

The present application is related to U.S. Provisional Patent Application No. 61/497,857, filed Jun. 16, 2011, entitled "SHAPE AND SYMMETRY DESIGN FOR LOOP FILTERS IN IMAGE/VIDEO CODING", and U.S. Provisional Patent Application No. 61/532,465, filed Sep. 8, 2011, entitled "SHAPE AND SYMMETRY DESIGN FOR LOOP FILTERS IN IMAGE/VIDEO CODING". Provisional Patent Application Nos. 61/497,857 and 61/532,465 are assigned to the assignee of the present application and is hereby incorporated by reference into the present application as if fully set forth herein. The present application hereby claims priority under 35 U.S.C. §119(e) to U.S. Provisional Patent Application Nos. 61/497,857 and 61/532,465.

TECHNICAL FIELD OF THE INVENTION

The present application relates generally to image processing and, more particularly, to a system and method for shape and symmetry design for filters in image/video coding.

BACKGROUND OF THE INVENTION

Adaptive loop filtering (ALF) techniques have been proposed to improve coding efficiency and the quality of encoded imagery and video. These ALF techniques design spatial filters to, among other things, minimize mean-squared error (MMSE), which is often a main source of noise. One purpose of adaptive loop filters is to reduce coding artifacts such that the filtered frames will have improved quality and will serve as better references for predictive coding. To achieve the goal of reduced MMSE, spatial filters such as Wiener filters have been designed that include filter coefficients and a control map (to indicate whether to apply the filters on block basis) which may be transmitted as side information. In some cases however, the information of filter coefficients and control map may be relatively large. Thus, the trade-off in designing adaptive loop filters involves the level of quality improvement against the size (rate) of side information.

Large filter sizes with less symmetry constraints on the filter coefficients generally have improved quality, while the amount of side information (i.e., the number of coefficients to be transmitted) is large. Imposing constraints on size and symmetry could reduce such side information at the expense of reduced quality. Most commonly used shapes for these spatial filters include square-shaped spatial filters, diamond-shaped spatial filters, and circle-shaped spatial filters. These shapes have relatively similar filtering support along vertical and horizontal directions. However, smaller vertical sizes will reduce memory bandwidth, which is attractive to hardware implementers.

It has been proposed to design special filter shapes having reduced vertical size, such as rectangular-shaped spatial filters, frusto-diamond-shaped spatial filters, or disk-shaped spatial filters. In these proposals, symmetry constraints imposed on filter coefficients may include point-symmetry. Nevertheless, such constraints may not be suitable for image/video content with strong directional features, since the filter may be forced to assigned same weight on pixels crossing an edge boundary. Directional symmetric constraints leads to improved quality, however such designs often increase the number of coefficients as compared to point-symmetry.

Cross-shaped filters have been proposed which lead to reduced number of coefficients. Also it has been shown to have good performance on content with dominant vertical and horizontal features. However since cross-shape filters do not have any coefficients on positions other than on the vertical and horizontal lines, it may not adequately resolve artifacts oriented in an arbitrary direction, especially artifacts along diagonal directions.

SUMMARY OF THE INVENTION

According to one embodiment, an apparatus includes a video/image encoder configured to design a two-dimensional star-shaped spatial filter and encode image/video information using the star-shaped spatial filter. The star-shaped spatial filter includes a first linear arrangement of coefficients that extend outwardly in a first diagonal direction from a center pixel coefficient, and a second linear arrangement of coefficients that extend outwardly in a second diagonal direction from the center pixel coefficient, and two linear arrangements of coefficients that extend outwardly in horizontal and vertical directions from the center pixel coefficient. The second diagonal direction is oriented in a different direction relative to the first diagonal direction.

According to another embodiment, an apparatus includes a video/image decoder configured to decode video information using a two-dimensional star-shaped spatial filter. The star-shaped spatial filter comprising a first linear arrangement of coefficients that extend outwardly in a first diagonal direction, and a second linear arrangement of coefficients that extend outwardly in a second diagonal direction from the center pixel coefficient, and two linear arrangements of coefficients that extend outwardly in horizontal and vertical directions from a center pixel coefficient. The second diagonal direction is oriented in a different direction relative to the first diagonal direction.

According to another embodiment, a method includes generating a two-dimensional star-shaped spatial filter in which the star-shaped spatial filter comprising a first linear arrangement of coefficients that extend outwardly in a first diagonal direction from a center pixel coefficient, and a second linear arrangement of coefficients that extend outwardly in a second diagonal direction, and two linear arrangements of coefficients that extend outwardly in horizontal and vertical directions from the center pixel coefficient. The second diagonal direction oriented in a different direction relative to the first diagonal direction. The method also includes encoding the image/video information using the X-shaped spatial filter to form encoded video information.

According to one embodiment, an apparatus includes a video/image encoder configured to design a two-dimensional X-shaped spatial filter and encode image/video information using the X-shaped spatial filter. The X-shaped spatial filter includes a first linear arrangement of coefficients that extend outwardly in a first diagonal direction from a center pixel coefficient, and a second linear arrangement of coefficients that extend outwardly in a second diagonal direction from the center pixel coefficient. The second diagonal direction is oriented in a different direction relative to the first diagonal direction.

According to another embodiment, an apparatus includes a video/image decoder configured to decode video information using a two-dimensional X-shaped spatial filter. The X-shaped spatial filter comprising a first linear arrangement of coefficients that extend outwardly in a first diagonal direction from a center pixel coefficient, and a second linear arrangement of coefficients that extend outwardly in a second diagonal direction from the center pixel coefficient. The second diagonal direction is oriented in a different direction relative to the first diagonal direction.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2 illustrates an example decoder according to one embodiment of the present disclosure;

FIGS. 3A and 3B illustrate several example spatial filters that may be generated by the encoder of FIG. 1 and used by the decoder of FIG. 2 to decode image/video information;

DETAILED DESCRIPTION OF THE INVENTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged image processing system.

The present disclosure describes an apparatus and method for spatial filtering of imagery and video information using adaptive loop filtering techniques. The proposed technique uses spatial filters having multiple coefficients arranged in a particular manner for resolving artifacts and noise along diagonal directions relative to a center pixel coefficient. Certain embodiments may include X-shaped spatial filters having coefficients arranged diagonally relative to the center pixel coefficient and star-shaped filters having coefficients arranged diagonally, vertically, and horizontally relative to the center pixel coefficient. Certain embodiments incorporating these types of shapes may provide a reduced number of coefficients relative to known spatial filters used with adaptive loop filtering techniques. This improvement may, in turn, lead to reduced overhead capacity for communication systems that transmit imagery and/or video information, such as telecommunication systems that provide communication among multiple mobile terminal handsets.

Figure 1:
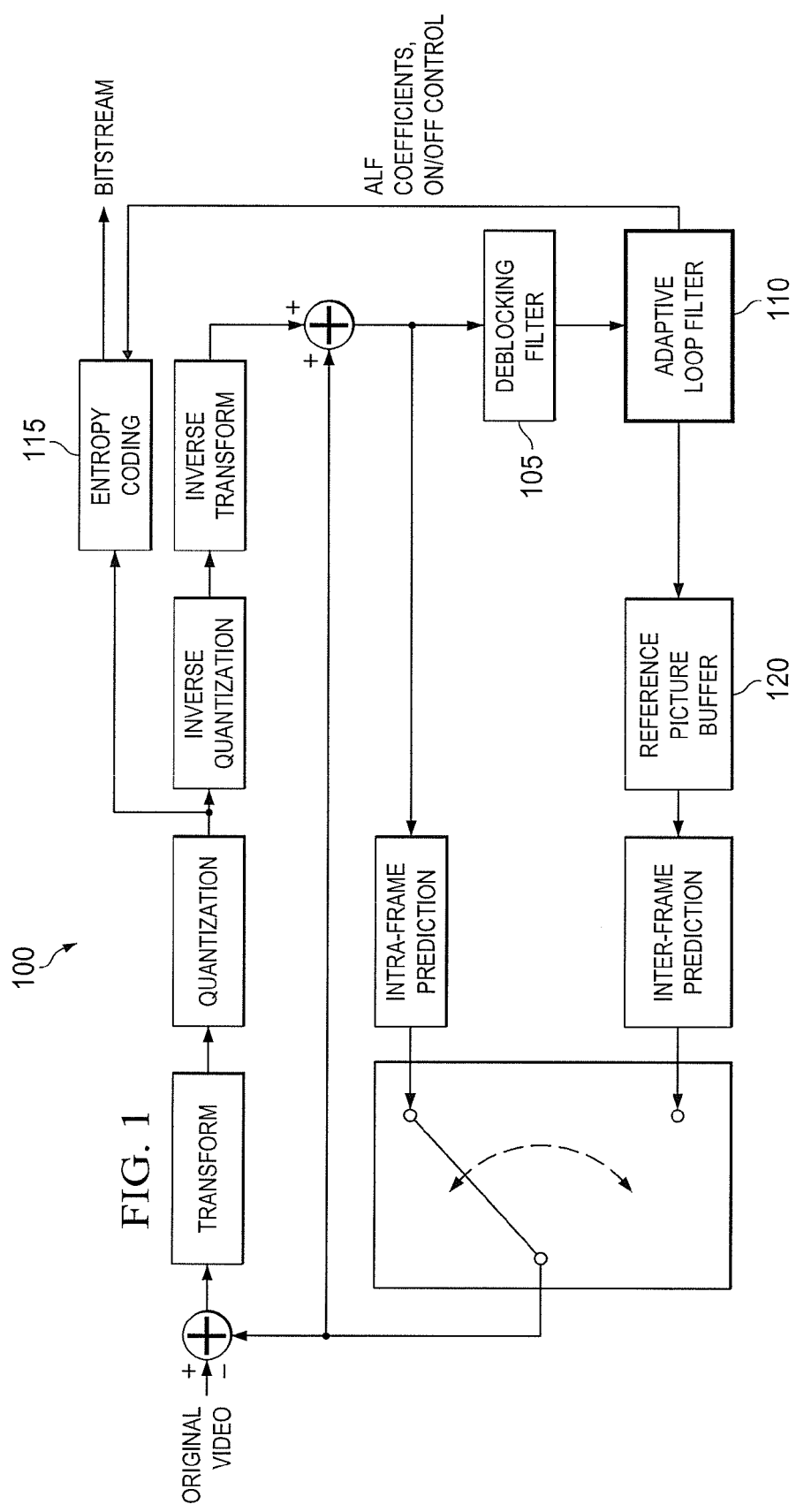
FIG. 1 illustrates an example encoder according to one embodiment of the present disclosure.

FIG. 1 illustrates an example encoder 100 according to one embodiment of the present disclosure. The example encoder 100 shown are for illustration purposes only, as other embodiments may include a subset of the components shown, or additional components to those components shown herein.

The encoder 100 includes a de-blocking filter 105 and an Adaptive Loop Filter (ALF) 110. The ALF 110 designs and apply ALF after the de-blocking filter 105 and is configured to receive an output from the de-blocking filter 105 and provide an outputted signal to an entropy coding block 115 and a reference picture buffer 120. The filtered references are stored in the reference picture buffer 120. Filter coefficients and a control map need to be encoded into the bitstream. Certain embodiments of the encoder 100 encode image/video information according to one or more spatial filters generated according to one or more characteristics of the image/video information. According to one embodiment, the encoder 100 may generate spatial filter having directional characteristics wherein symmetric constraints are imposed on the filter coefficients according to the directional classification, and classify pixels or blocks in a video frame by computing and comparing at least one directional feature for filter adaptation.

The encoder 100 may be implemented in any system that transmits imagery and/or video information. For example, the encoder 100 may be implemented in a telecommunication system that provides imagery/video information sharing as well as conventional telephony services to multiple mobile terminals. As another example, the encoder 100 may be implemented in a video broadcast system, such as cable television or satellite video broadcast providers that broadcast video information to multiple subscribers of these video broadcasts.

FIG. 2 illustrates an example decoder 200 according to one embodiment of the present disclosure. The example decoder 200 shown is for illustration purposes only, as other embodiments may include a subset of the components shown or additional components to those components shown herein.

The video decoder 200 includes an entropy decoder 205, which decode the ALF filter coefficients and on/off control map; and a de-blocking filter 210 and an Adaptive Loop Filter (ALF) 215, which construct filter(s) according to the decoded filter coefficients, received as the output from the entropy decoder 205, and apply the filter(s) after the de-blocking filter 210. The ALF 215 provides an outputted signal to a reference picture buffer 220. The filtered references are stored in the reference picture buffer 220. Embodiments of the present disclosure provide a modified adaptive loop filter 215 that decodes image/video information according to one or more spatial filters received from the encoder 100.

Similar to the ALF 110 in the encoder 100, certain embodiments of the decoder 200 may classify pixels or blocks in a video frame by computing and comparing at least one directional feature for filter adaptation, and decode image/video information according to the directional filters generated by the encoder 100. One particular embodiment includes an encoder that classifies imagery or video information by computing and comparing at least one directional feature, such as a local gradient in the image/video information. One such embodiment is described in U.S. patent application entitled "Filter Adaptation With Directional Features For video/image Coding," Ser. No. 13/347,589, and filed on Jan. 10, 2012, which is hereby incorporated by reference in its entirety.

Although FIGS. 1 and 2 together illustrate one example of an encoder/decoder for processing image/video information, various changes may be made to FIG. 1. For example, the encoder 100 and/or decoder 200 could include a subset of the components shown in FIGS. 1 and 2. The encoder 100 and/or decoder 200 could also include additional components not shown in FIGS. 1 and 2. Additionally, the functional division shown in FIGS. 1 and 2 are for illustration only. Various components in FIGS. 1 and 2 could be combined, further subdivided, or omitted and additional components could be added according to particular needs.

Figures 3A, 3B:
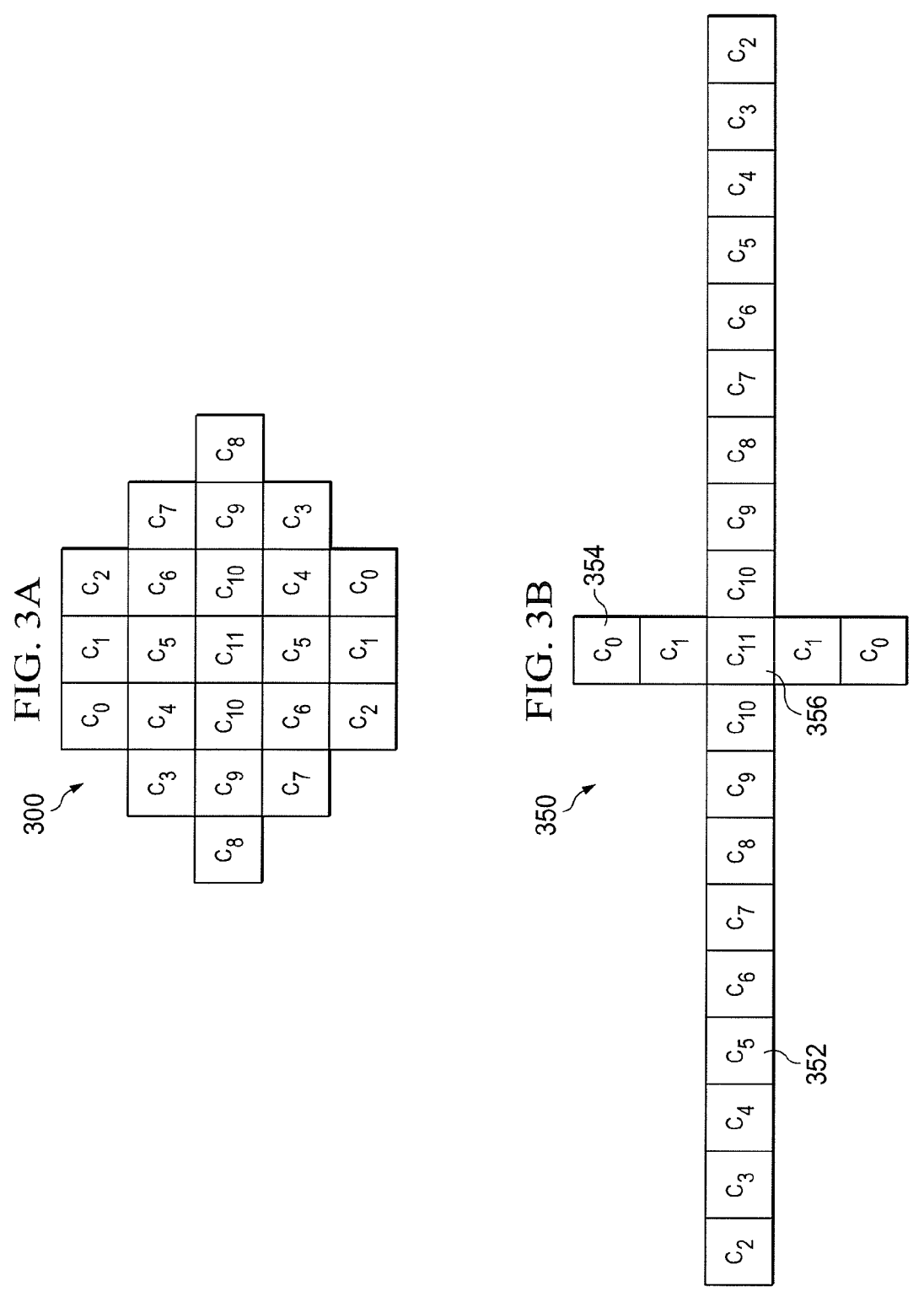

FIGS. 3A and 3B illustrate several example spatial filters that may be generated by the encoder 100 of FIG. 1 and used by the decoder 200 of FIG. 2 to decode image/video information. Specifically, FIG. 3A illustrates an example frusto-diamond-shaped spatial filter 300 while FIG. 3B illustrates an example cross-shaped filter 350.

The frusto-diamond shaped spatial filter 300 has multiple coefficients arranged in a frusto-diamond shape with a vertical size of "5" and a horizontal size of "7". That is, coefficients of the frusto-diamond-shaped spatial filter 300 extend vertically over five pixels while extending horizontally over seven pixels. A spatial filter such as this may be implemented with a total of 12 coefficients if point symmetry is used. Point symmetry of spatial filters will be described in detail below.

The cross-shaped spatial filter 350 includes a first linear arrangement of contiguous coefficients 352 that extend outwardly in a horizontal direction from a center pixel coefficient 356. The cross-shaped spatial filter 350 also includes a vertical linear arrangement of contiguous coefficients 354 that extend outwardly in a vertical direction from the center pixel coefficient 356. A spatial filter such as this may be implemented with a total of 8 coefficients if point symmetry is used.

Figure 4:
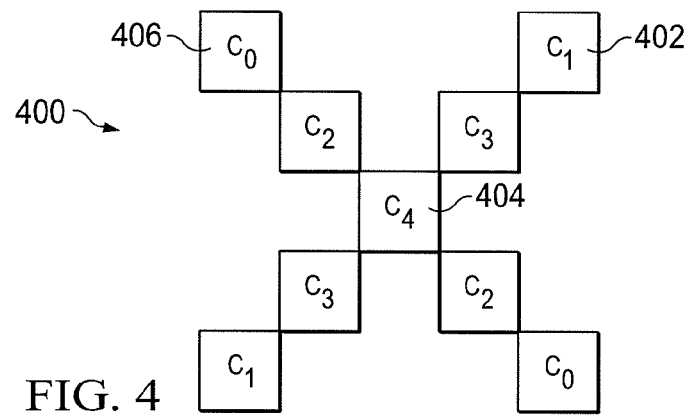
FIG. 4 illustrates an example X-shaped spatial filter according to one embodiment of the present disclosure.

FIG. 4 illustrates an example X-shaped spatial filter 400 according to the teachings of the present disclosure that may be generated by the encoder 100 of FIG. 1 and used by the decoder 200 of FIG. 2 to decode image/video information. The X-shaped spatial filter 400 includes a first linear arrangement of contiguous coefficients 402 that extend outwardly in a first diagonal direction from a center pixel coefficient 404. The X-shaped spatial filter 400 also includes a second linear arrangement of contiguous coefficients 406 that extend outwardly in a second diagonal direction from the center pixel coefficient 404. As shown, the arrangement of the first and second coefficients 402 and 406 may be generally viewed as having a "X" shape.

In one embodiment, the first coefficients 402 may be substantially orthogonal to the second coefficients 406. In other embodiments, the first and second coefficients 402 and 406 may have any direction relative to one another such that one set of coefficients has a positive slope and the other has a negative slope. Additionally, the example spatial filter 400 shown includes first and second coefficients 402 and 406 each having five coefficients including the center pixel coefficient 404. In other embodiments, the first and second coefficients 402 and 406 may each have fewer than five coefficients or more than five coefficients.

In another embodiment, the coefficients of the spatial filter 400 may include point symmetry along one or more diagonal directions. For the example embodiment shown, the first coefficients 402 include coefficients (C3 and C1) extending in an upward diagonal direction that are a mirror image of coefficient (C3 and C1) extending in a downward diagonal direction. Thus, the first coefficients 402 may be considered to have point symmetry along an axis perpendicular to its extent. Likewise, the second coefficients 406 include coefficients (C2 and C0) extending in an upward diagonal direction that are a mirror image of coefficient (C2 and C0) extending in a downward diagonal direction. Thus, the second coefficients 402 may be considered to have point symmetry along an axis perpendicular to its extent.

Although the example X-shaped spatial filter shown includes both sets of coefficients 402 and 406 having symmetry about the center pixel coefficient 404, other embodiments may include only one of the sets of coefficients 402 or 406 having symmetry about the center pixel coefficient 404. Certain embodiments incorporating symmetric constraints to either of the first and/or second set of coefficients 402 and 406 may provide an advantage in that fewer need to be generated and transmitted with the image/video information, thereby reducing overhead capacity.

Figure 5A:
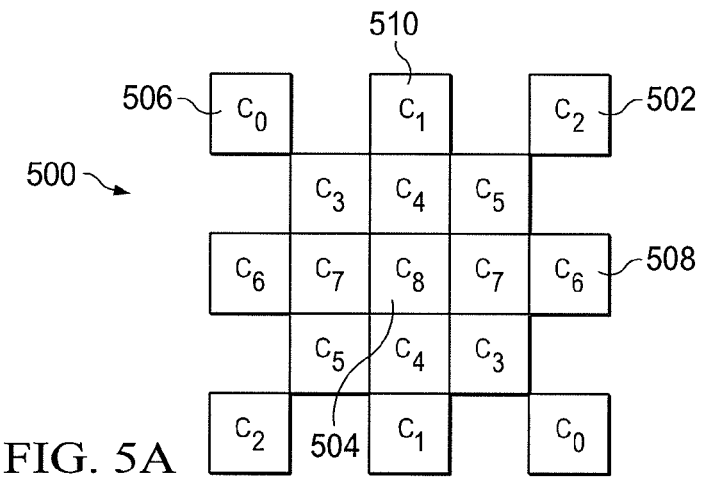
FIGS. 5A and 5E illustrate example star-shaped spatial filters according to embodiments of the present disclosure.
Figure 5B:
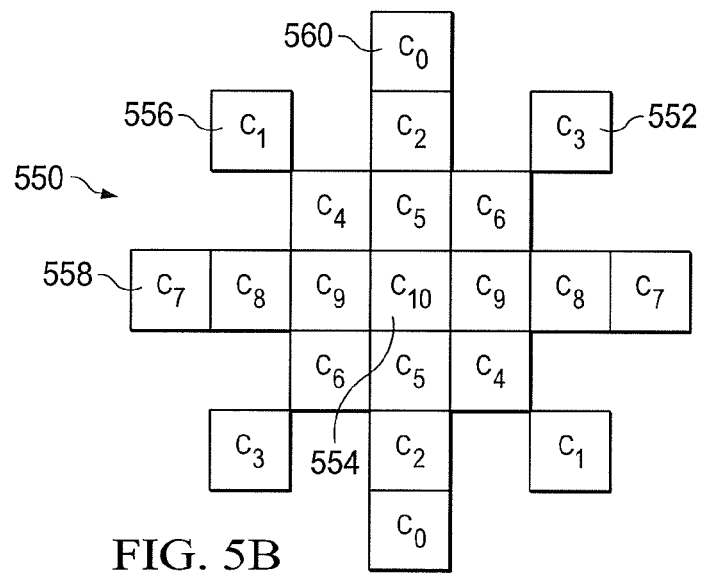

FIGS. 5A and 5B illustrate example star-shaped spatial filters 500 and 550, respectively, according to the teachings of the present disclosure that may be generated by the encoder 100 of FIG. 1 and used by the decoder 200 of FIG. 2 to decode image/video information.

The star-shaped spatial filter 500 includes a first and second linear arrangement of a contiguous set of coefficients 502 and 506 that extend outwardly in a first diagonal direction from a center pixel coefficient 504 in a similar manner to the first and second set of coefficients 502 and 506 of FIG. 5. The star-shaped spatial filter 500 differs, however, in that it also includes a third set of coefficients 508 that extend horizontally from the center pixel coefficient 504 and a fourth set of coefficients 510 that extend vertically from the center pixel coefficient 504.

While the cross-shaped spatial filter 350 shown above may be ideally suited for vertical and horizontal directional features, the star-shaped spatial filter 500 may be good for vertical, horizontal as well as panning of the image/video information. Additionally, the star-shaped spatial filter 500 may be well suited for filtering image/video information having predominantly diagonal direction characteristics.

The star-shaped spatial filter 500 has a vertical size of five and a horizontal size of five, which is commonly referred to as a 5×5 size. If point symmetry is used, the 5×5 star-shaped spatial filter 500 may be implemented with a total of nine coefficients. The 5×5 star-shaped spatial filter 500 may exhibit certain advantages. For example certain embodiments of the star-shaped spatial filter 500 may exhibit over 50 percent reduction in computational complexity relative to a diamond-shaped filter with more than 20 coefficients, while preserving over 80 percent of the filtering gains. Additionally, certain embodiments of the star-shaped spatial filter 500 may exhibit over 25 percent reduction in computational complexity relative to using both filters 300 and 350 of FIGS. 3A and 3B, both have 12 coefficients when point symmetry is enforced, while preserving over 90 percent of the filtering gains.

As shown, the star-shaped spatial filter 500 includes five coefficients in each set of coefficients including the center pixel coefficient 504. In other embodiments, star-shaped spatial filter 500 may includes coefficient sets having less than five coefficients or more than five coefficients. When each set of coefficients of the star-shaped spatial filter 500 includes five coefficients, and each of the first, second, third, and fourth set of coefficients of the star-shape spatial filter 500 have symmetry about the center pixel coefficient; the star-shape spatial filter 500 may be generated with a total of nine coefficients.

The star-shaped spatial filter 550 includes a first linear arrangement of a contiguous set of coefficients 552 a second linear arrangement of a contiguous set of coefficients 556, a third linear arrangement of a contiguous set of coefficients 558, and a fourth linear arrangement of a contiguous set of coefficients 560 that are similar to those of the star-shaped spatial filter of FIG. 5A. The star-shaped spatial filter 550 differs, however, in that its vertical height is seven as opposed to the filter 500, which has a vertical height of five. Thus, the star-shaped spatial filter 550 may be considered to have a 7×7 size. Additionally, the star-shaped spatial filter 550 may be implemented with a total of eleven coefficients.

Certain embodiments incorporating the star-shaped filter 500 may provide an advantage over conventional spatial filter shapes in that fewer coefficients may be necessary, while providing comparable filtering qualities. Additionally, the star-shaped spatial filter 500 may resolve artifacts and noise in a diagonal direction with increased quality and efficiency than other spatial filtering shapes, such as square, diamond, circle, and cross-shaped spatial filter designs.

Figure 6A:
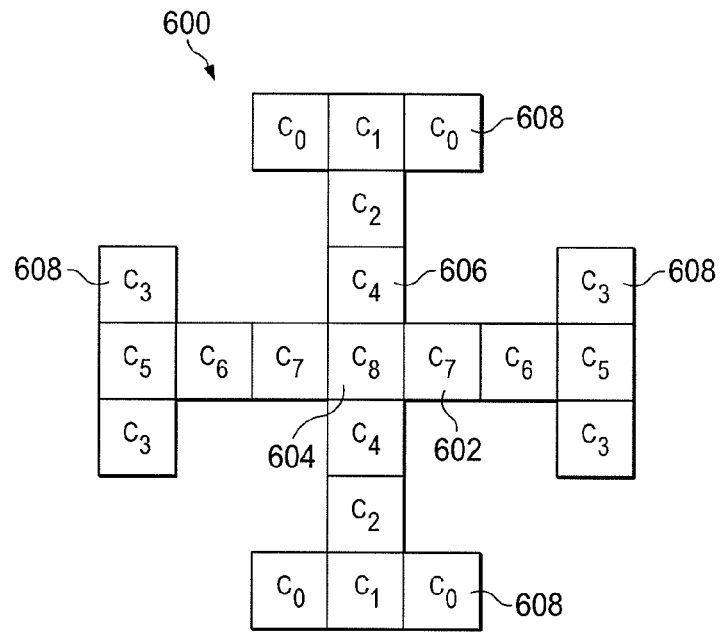
FIGS. 6A and 6B illustrate example enhanced cross-shaped spatial filters according to embodiments of the present disclosure.
Figure 6B:
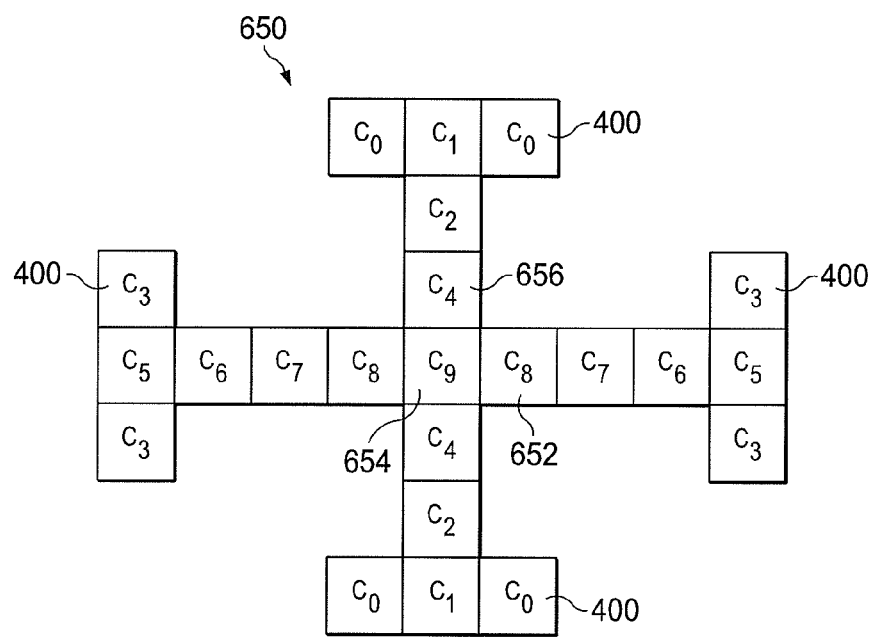

FIGS. 6A and 6B illustrate example enhanced cross-shaped spatial filters 600 and 650, respectively, according to the teachings of the present disclosure that may be generated by the encoder 100 of FIG. 1 and used by the decoder 200 of FIG. 2 to decode image/video information. The enhanced cross-shaped spatial filter 600 includes a first and second linear arrangement of a contiguous set of coefficients 602 and 606 that extend outwardly in horizontal and vertical directions from a center pixel coefficient 604. The enhanced cross-shaped spatial filter 600 also includes third, fourth, fifth, and sixth sets of coefficients 608 that are arranged on the ends of each of the first and second sets of coefficients and extend orthogonally relative to the set of coefficients on which it is arranged.

Like the spatial filter 600, the enhanced cross-shaped spatial filter 650 includes a first and second linear arrangement of a contiguous set of coefficients 652 and 656 that extend outwardly in horizontal and vertical directions from a center pixel coefficient 654. Also, the enhanced cross-shaped spatial filter 650 also includes third, fourth, fifth, and sixth sets of coefficients 658 that are arranged on the ends of each of the first and second sets of coefficients and extend orthogonally relative to the set of coefficients on which it is arranged. The spatial filter 650 differs from spatial filter 600, however, in that the spatial filter has a horizontal size of nine while the spatial filter has a horizontal size of seven.

Certain embodiments using an enhanced cross-shaped filter 600 or 650 may provide enhanced directional filtering and de-noising while not increasing access area. For example, the enhanced cross-shaped filters 600 or 650 may provide enhanced resolution for the center pixel coefficient 600 using additional filtering provided by pixel information at the outer extremities of each of the first and second sets of coefficients.

In one embodiment, various spatial filters as described above may be alternatively applied to image/video information for filtering the image/video information according to directional characteristics in the image/video information. One such example process for encoding image/video information using multiple differing types of spatial features is described herein below.

Figure 7:
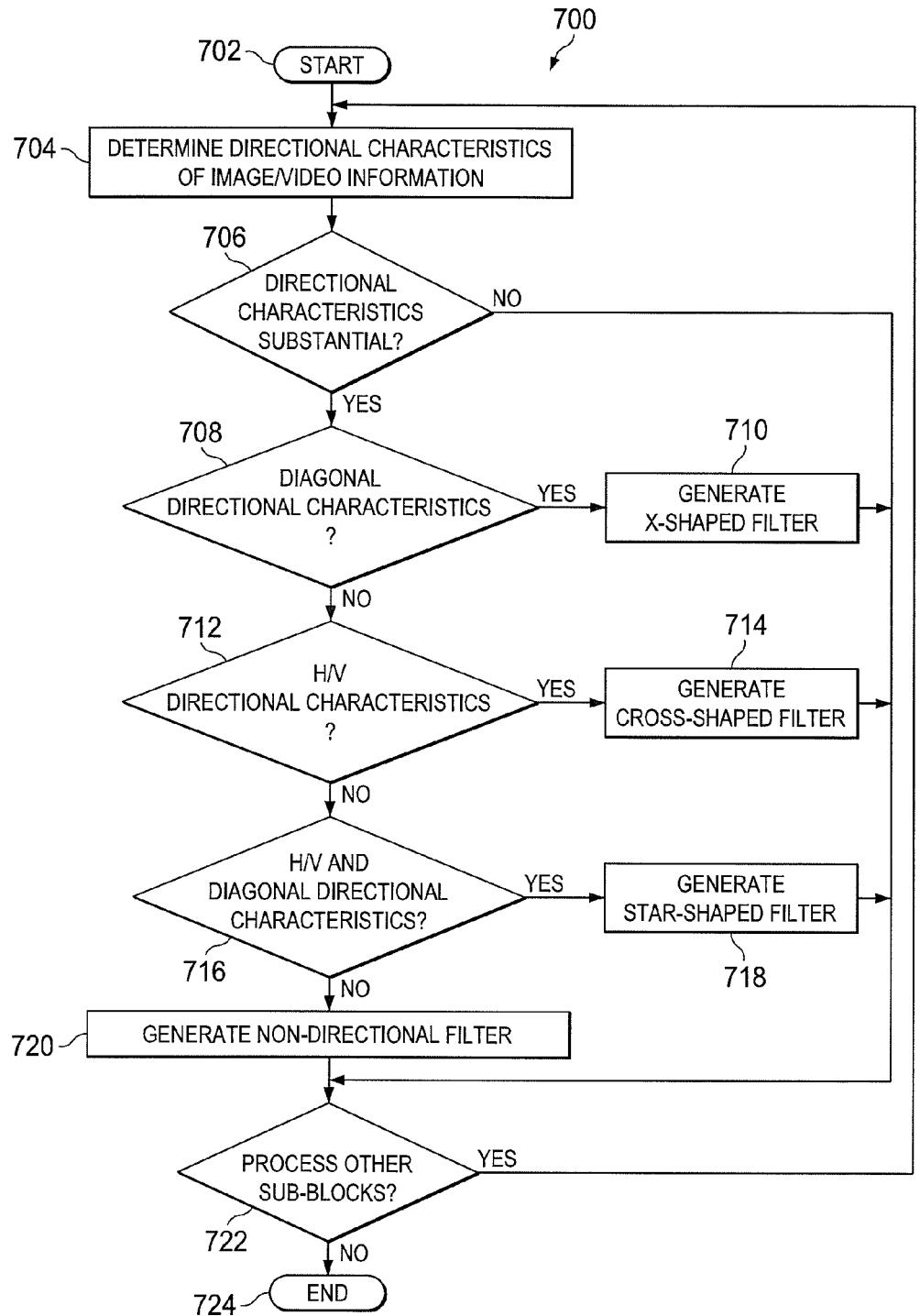
FIG. 7 illustrates an example process that may be performed by the encoder to encode image/video information according to one embodiment of the present disclosure.

FIG. 7 illustrates an example process 700 that may be performed by the encoder 100 to encode image/video information using the spatial filters described above. In step 702, the process is initiated.

In step 704, the encoder determines any directional characteristics of a portion or sub-block of image/video information. In one embodiment, the directional characteristics may include gradients of the image/video information that extends across the sub-block.

In step 706, the encoder determines whether the determined directional characteristics are substantial. For example, the encoder may compare the level of determined directional gradient with a specified threshold value to determine whether the sub-block is, or is not, substantial. If the directional characteristics are not substantial, processing continues as step 722. However, if the directional characteristics are determined to be substantial, processing continues at step 708.

At step 708, the encoder determines whether the image/video information includes predominantly diagonal direction characteristics. If so, processing continues at step 710, otherwise processing continues at step 712.

At step 710, the encoder generates an X-shaped spatial filter and encodes the image/video information according to the generated X-shaped spatial filter. Once the X-shaped spatial filter is generated, processing continues at step 710.

At step 712, the encoder determines whether the image/video information includes predominantly horizontal and/or vertical direction characteristics. If so, processing continues at step 714, otherwise processing continues at step 716.

At step 714, the encoder generates a cross-shaped spatial filter and encodes the image/video information according the generated cross-shaped spatial filter. In one embodiment, the encoder may generate an enhanced cross-shaped filter in the event that the sub-block includes artifacts and/or noise at or near the outer extent of the cross-shaped filter. Once the cross-shaped spatial filter is generated, processing continues at step 722.

At step 716, the encoder the encoder determines whether the image/video information includes both diagonal direction characteristics and horizontal/vertical direction characteristics. If so, processing continues at step 718, otherwise processing continues at step 720.

At step 718, the encoder generates a star-shaped spatial filter and encodes the image/video information according the generated star-shaped spatial filter. Once the star-shaped spatial filter is generated, processing continues at step 702 to process the next sub-block of image/video information.

At step 720, the encoder generates a non-directional spatial filter and encodes the image/video information according the generated star-shaped spatial filter. For example, the encoder may generate a circle-shaped filter or a frusto-diamond shaped filter when the image/video information includes gradients with no substantial directional characteristics. Once the non-directional spatial filter is generated, processing continues at step 722.

At step 722, the encoder determines whether additional image/video information is to be processed. If so, processing reverts back to step 704 for the next sub-block of image/video information. However, if no additional sub-blocks of image/video information are to be processed, the method ends in step 722.

Although FIG. 7 illustrates one example of a method 700 for encoding image/video information using X-shaped, cross-shaped, and star-shaped spatial filters, various changes may be made to FIG. 7. For example, the process may be implemented in which only the X-shaped spatial filter or no spatial filter is applied to the image/video information; that is, steps 712 through 718 are not applied to the image/video information. For another example, the process may be implemented in which only the star-shaped spatial filter or no spatial filter is applied to the image/video information; that is, steps 708 through 714 are not applied to the image/video information. For yet another example, the process may be implemented in which other spatial filters are applied to the image/video information, such as circle-shaped spatial filters and square-shaped filter, and/or diamond-shaped filters. Additionally, the steps shown above are not constrained to be sequentially performed and thus, may be performed in any desired order.

Figure 8:
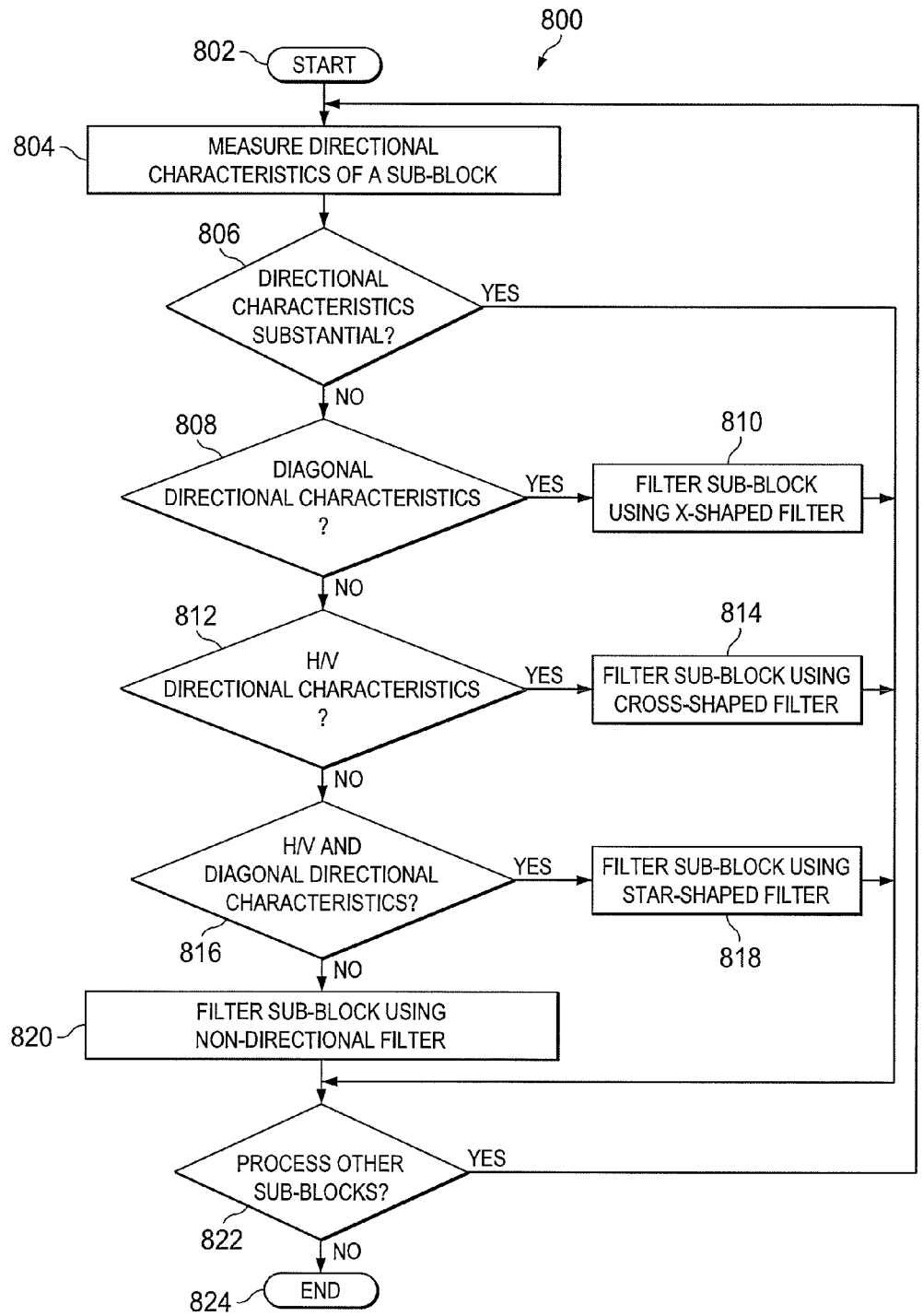
FIG. 8 illustrates an example process that may be performed by the decoder to decode image/video information according to one embodiment of the present disclosure.

FIG. 8 illustrates an example process 800 that may be performed by the decoder 200 to decode image/video information using the spatial filters described above. In step 802, the process is initiated.

In step 804, the decoder measures any directional characteristics of a sub-block of image/video information. In step 806, the decoder determines whether the determined directional characteristics are substantial. For example, the decoder may compare the measured level of directional characteristics with a specified threshold value to determine whether the directional characteristics are substantial. If the directional characteristics are not substantial, processing continues as step 822. However, if the directional characteristics are determined to be substantial, processing continues at step 808.

At step 808, the decoder determines whether the image/video information includes predominantly diagonal direction characteristics. If so, processing continues at step 810, otherwise processing continues at step 812.

At step 810, the decoder filters the sub-block of image/video information using an X-shaped spatial filter. Once the sub-block is filtered, processing continues at step 810.

At step 812, the decoder determines whether the image/video information includes predominantly horizontal and/or vertical direction characteristics. If so, processing continues at step 814, otherwise processing continues at step 816.

At step 814, the decoder filters the sub-block of image/video information using a cross-shaped spatial filter.

At step 816, the decoder the decoder determines whether the image/video information includes both diagonal direction characteristics and horizontal/vertical direction characteristics. If so, processing continues at step 818, otherwise processing continues at step 820.

At step 818, the decoder filters the sub-block of image/video information using a star-shaped spatial filter. Once the sub-block is filtered, processing continues at step 802 to process the next sub-block of image/video information.

At step 820, the decoder filters the sub-block of image/video information using a non-directional spatial filter. For example, the decoder may filter the image/video information using a circle-shaped filter or a frusto-diamond shaped filter when the image/video information includes gradients with no substantial directional characteristics. Once the sub-block is filtered, processing continues at step 822.

At step 822, the decoder determines whether additional image/video information is to be processed. If so, processing reverts back to step 804 for the next sub-block of image/video information. However, if no additional sub-blocks of image/video information are to be processed, the method ends in step 822.

Although FIG. 8 illustrates one example of a method 800 for decoding image/video information using X-shaped, cross-shaped, and star-shaped spatial filters, various changes may be made to FIG. 8. For example, the process may be implemented in which other spatial filters are applied to the image/video information, such as circle-shaped spatial filters and square-shaped filter, and/or diamond-shaped filters. Additionally, the steps shown above are not constrained to be sequentially performed and thus, may be performed in any desired order.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus comprising:
an image processing circuitry including: a video/image encoder configured to design a two-dimensional star-shaped spatial filter and encode image/video information using the star-shaped spatial filter, the star-shaped spatial filter comprising:
a first linear arrangement of coefficients that extend outwardly in a first diagonal direction from a center pixel coefficient;
a second linear arrangement of coefficients that extend outwardly in a second diagonal direction from the center pixel coefficient;
a third linear arrangement of coefficients that extend outwardly in a horizontal direction from the center pixel coefficient; and
a fourth linear arrangement of coefficients that extend outwardly in a vertical direction from the center pixel coefficient,
wherein the second diagonal direction is oriented in a different direction relative to the first diagonal direction, and wherein at least one of a first coefficient and a second coefficient of the star-shaped spatial filter comprise point symmetry about the center pixel coefficient.

2. The apparatus of claim 1, wherein at least one of a first coefficient and a second coefficient of each of the first, second, third, and fourth linear arrangement of coefficients of the star-shaped spatial filter comprise point symmetry about the center pixel coefficient.

3. The apparatus of claim 1, wherein the encoder is configured to encode the image/video information when the image/video information includes directional characteristics greater than a threshold value.

4. The apparatus of claim 1, wherein the star-shaped spatial filter has a vertical size and a horizontal size different from the vertical size.

5. The apparatus of claim 1, wherein the star-shaped spatial filter has a vertical size of seven and a horizontal size of seven.

6. The apparatus of claim 1, wherein the star-shaped spatial filter has the following shape:

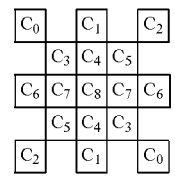

7. An apparatus comprising:
an image processing circuitry including: a video/image encoder configured to design a two-dimensional cross-shaped spatial filter and encode image/video information using the cross-shaped spatial filter, the cross-shaped spatial filter comprising:

a first linear arrangement of coefficients that extend outwardly in a horizontal direction from a center pixel coefficient, a second linear arrangement of coefficients that extend outwardly in a vertical direction from the center pixel coefficient, a third linear arrangement of coefficients that extend orthogonally outward from a first end pixel coefficient of the first linear arrangement, a fourth linear arrangement of coefficients that extend orthogonally outward from a second end pixel coefficient of the first linear arrangement, a fifth linear arrangement of coefficients that extend orthogonally outward from a first end pixel coefficient of the second linear arrangement, and a sixth linear arrangement of coefficients that extend orthogonally outward from a second end pixel coefficient of the second linear arrangement.

8. The apparatus of claim 7, wherein the cross-shaped spatial filter has the following shape:

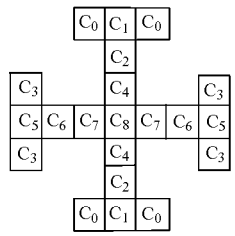

9. A method comprising:

generating a two-dimensional star-shaped spatial filter, the star-shaped spatial filter comprising a first linear arrangement of coefficients that extend outwardly in a first diagonal direction from a center pixel coefficient, a second linear arrangement of coefficients that extend outwardly in a second diagonal direction from the center pixel coefficient, a third linear arrangement of coefficients that extend outwardly in a horizontal direction from the center pixel coefficient, and a fourth linear arrangement of coefficients that extend outwardly in a vertical direction from the center pixel coefficient, the second diagonal direction oriented in a different direction relative to the first diagonal direction, wherein at least one of a first coefficient and a second coefficient of the star-shaped spatial filter comprise point symmetry about the center pixel coefficient; and encoding the image/video information using the star-shaped spatial filter to form encoded video information.

10. The method of claim 9, further comprising encoding the image/video information when the image/video information includes diagonal characteristics greater than a threshold value.

11. An apparatus comprising:

an image processing circuitry including: a video/image decoder configured to decode video information using a two-dimensional star-shaped spatial filter, the star-shaped spatial filter comprising:

a first linear arrangement of coefficients that extend outwardly in a first diagonal direction from a center pixel coefficient;

a second linear arrangement of coefficients that extend outwardly in a second diagonal direction from the center pixel coefficient;

a third linear arrangement of coefficients that extend outwardly in a horizontal direction from the center pixel coefficient; and a fourth linear arrangement of coefficients that extend outwardly in a vertical direction from the center pixel coefficient, wherein the second diagonal direction is oriented in a different direction relative to the first diagonal direction, and wherein at least one of a first coefficient and a second coefficient of the star-shaped spatial filter comprise point symmetry about the center pixel coefficient.

12. The apparatus of claim 11, wherein at least one of a first coefficients and a second coefficients of the star-shaped spatial filter comprise point symmetry about the center pixel coefficient.

13. The apparatus of claim 11, wherein the star-shaped spatial filter has a vertical size of five and a horizontal size of seven.

14. The apparatus of claim 11, wherein the star-shaped spatial filter has a vertical size of seven and a horizontal size of seven.

15. The apparatus of claim 11, wherein the star-shaped spatial filter has the following shape:

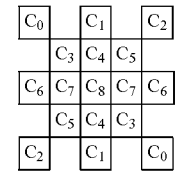

16. An apparatus comprising:

an image processing circuitry including: a video/image decoder configured to decode video information using a two-dimensional cross-shaped spatial filter, the cross-shaped spatial filter comprising:

a first linear arrangement of coefficients that extend outwardly in a horizontal direction from a center pixel coefficient, a second linear arrangement of coefficients that extend outwardly in a vertical direction from the center pixel coefficient, a third linear arrangement of coefficients that extend orthogonally outward from a first end pixel coefficient of the first linear arrangement, a fourth linear arrangement of coefficients that extend orthogonally outward from a second end pixel coefficient of the first linear arrangement, a fifth linear arrangement of coefficients that extend orthogonally outward from a first end pixel coefficient of the second linear arrangement, and a sixth linear arrangement of coefficients that extend orthogonally outward from a second end pixel coefficient of the second linear arrangement.

17. The apparatus of claim 16, wherein the cross-shaped spatial filter has the following shape:

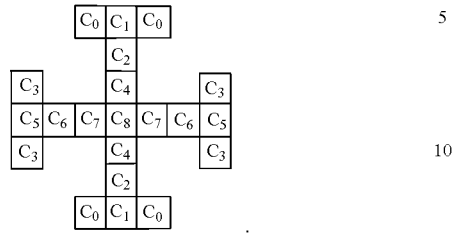

18. A method comprising:
  decoding a sub-block of image/video information using a star-shaped filter, the star-shaped spatial filter comprising a first linear arrangement of coefficients that extend outwardly in a first diagonal direction from a center pixel coefficient, a second linear arrangement of coefficients that extend outwardly in a second diagonal direction from the center pixel coefficient, a third linear arrangement of coefficients that extend outwardly in a horizontal direction from the center pixel coefficient, and a fourth linear arrangement of coefficients that extend outwardly in a vertical direction from the center pixel coefficient, the second diagonal direction oriented in a different direction relative to the first diagonal direction, and wherein at least one of a first coefficient and a second coefficient of the star-shaped spatial filter comprise point symmetry about the center pixel coefficient.

* * * * *